(12) United States Patent
Zhong et al.

(10) Patent No.: US 7,352,937 B2
(45) Date of Patent: Apr. 1, 2008

(54) DEVICES, SYSTEMS AND METHODS FOR CONNECTING A SINGLE MODE FIBER TO A LEGACY MULTI-MODE FIBER

(75) Inventors: Johnny Zhong, Union City, CA (US); Steve Wang, San Jose, CA (US); Yin Zhang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 24 days.

(21) Appl. No.: 10/738,250

(22) Filed: Dec. 17, 2003

(65) Prior Publication Data

US 2005/0002614 A1  Jan. 6, 2005

Related U.S. Application Data

(60) Provisional application No. 60/434,775, filed on Dec. 17, 2002.

(51) Int. Cl.
*G02B 6/44* (2006.01)
*G02B 6/00* (2006.01)

(52) U.S. Cl. ..................... 385/101; 385/140
(58) Field of Classification Search ............... 385/101
See application file for complete search history.

(56) References Cited

U.S. PATENT DOCUMENTS

| | | | |
|---|---|---|---|
| 5,319,733 A * | 6/1994 | Emmons et al. | ............ 385/140 |
| 5,949,931 A | 9/1999 | Kitamura | |
| 6,246,821 B1 * | 6/2001 | Hemken et al. | ............ 385/101 |
| 6,273,619 B1 * | 8/2001 | Shahid et al. | ................. 385/70 |
| 6,304,352 B1 | 10/2001 | Cunningham et al. | |
| 6,356,687 B1 * | 3/2002 | Shahid | ........................ 385/49 |
| 6,434,302 B1 | 8/2002 | Fidric et al. | |
| 2002/0021469 A1 * | 2/2002 | Cunningham et al. | ...... 359/152 |

OTHER PUBLICATIONS

Documentation entitled "Fiber Selection Guide for Premises Networks," Corning Incorporated Telecommucations Products Division, pp. 1-8, Issued May 1998, by David M. Bean.

(Continued)

*Primary Examiner*—Frank G. Font
*Assistant Examiner*—Mary El-Shammaa
(74) *Attorney, Agent, or Firm*—Workman Nydegger

(57) ABSTRACT

Exemplary embodiments of the present invention provide for methods to launch data signals from single mode fiber optic cable into legacy multimode fiber optic cable. In one exemplary embodiment, a single mode fiber is offset slightly from the axis of a multimode fiber, thus only exciting the outer mode of the multimode fiber. In an alternate exemplary embodiment, a core portion of the single mode fiber is exposed, heated, and fused with a cladding portion of the multimode fiber. In yet another alternate exemplary embodiment, various lenses can be used to collimate and focus light signals from single mode fibers into multimode fibers, and vice versa. In these exemplary embodiments, the transmitted light signals can be in the range of from 1470 to about 1610 nm with, for example, a 20 nm channel separation. Other wavelengths and channel separations are also possible.

20 Claims, 4 Drawing Sheets

OTHER PUBLICATIONS

Documentation entitled "Small Form Factor Connectors," Corning Incorporated Telecommunication Products Division, pp. 1-2, Issued Nov. 1999, by Preston D. Buck.

Documentation entitled "50 μm Optical Fiber Q&A," Corning Incorporated, pp. 1-8, Issued Apr. 2001, by Subodh Sharma and Lisa Peng.

Documentation entitled "Characterizing Multimode Fiber Bandwidth for Gigabit Ethernet Applications," Corning Incorporated, pp. 1-5, Issued Aug. 2001, by Michael J. Hackert.

Bahaa E.A. Saleh & Malvin Carl Teich, *Fundamentals of Photonics*, 272-309, (John Wiley & Sons, Inc., New York 1991), Chapter 8—Fiber Optics.

* cited by examiner

DEVICES, SYSTEMS AND METHODS FOR CONNECTING A SINGLE MODE FIBER TO A LEGACY MULTI-MODE FIBER

CROSS-REFERENCE TO RELATED APPLICATIONS

This application claims priority to and the benefit of U.S. Provisional Patent Application No. 60/434,775, filed on Dec. 17, 2002 and entitled "Connecting a Single Mode Fiber to a Legacy Multi-Mode Fiber", which is incorporated herein by reference in its entirety.

BACKGROUND OF THE INVENTION

1. The Field of the Invention

This invention relates to fiber-optic couplers, and more specifically to fiber optic couplers designed to connect single mode optical fiber to legacy multimode optical fiber.

2. The Relevant Technology

The transmission of data across fiber optic cable has become increasingly common since the early 1970's. With reference to FIG. 1A, a basic fiber optic cable 100 is shown. In its simplest form, fiber optic cable 100 is a glass (silicon) strand 102 of uniform thickness having a uniform refractive index $n_1$. This central glass strand 102, usually referred to as the core, is surrounded by a cladding 104 with refractive index $n_2$. Light propagates through central glass strand 102 and is reflected at the interface between central glass strand 102 and cladding 104, thus guiding the light along a fiber axis 106 by total internal reflection. One property of the fiber is the numerical aperture (NA). One definition for the NA is $[(n_1)^2+(n_2)^2]^{1/2}$, where $n_1$ and $n_2$ are defined above.

Another way to think about the NA is by defining a maximum off axis angle $\theta$. Angle $\theta$ is the angle formed by the extreme bound meridional rays of light accepted by core 102 of fiber 100. It can be calculated using the formula $\theta=\frac{1}{2}\sin^{-1}(NA)$. This will be discussed in more detail below.

Fiber optic cables are produced with various core diameters, depending on the application. In larger diameter fibers, currently standardized at 50 or 62.5 microns, the light can take multiple paths while traveling along the fiber. These multiple paths are known as modes, and their number is governed by the normalized frequency parameter or V-parameter. The V-parameter for a particular fiber is a function of the radius of the fiber ($\alpha$), the NA, and the wavelength of the light signals being propagated through the fiber ($\lambda$) defined by the equation $$V = 2\pi \frac{a}{\lambda} NA.$$

Fibers having diameters of 50 and 62.5 microns have larger V-parameters and are thus known as multimode fibers (MMF). Because of a phenomenon known as modal dispersion, related to the differing distances traveled by light signals having the different modes, multimode fibers can carry data for only short distances, such as in and around a particular building.

In smaller diameter fibers, the V-parameter is small enough that only a single mode of light can propagate through the optical fiber. These smaller diameter fibers are known as single mode fibers (SMF). Single mode fiber is used to transmit data much longer distances, up to 100 km or longer. With regular amplification, single mode fibers can transmit optical signals as far as is necessary. Additional background information on fiber optic cables can be found in a book by B. E. A. Saleh and M. C. Teich, entitled *Fundamentals of Photonics*, John Wiley and Sons, New York, 1991.

FIG. 1B shows a graded index MMF 120, having a core portion 122 and a cladding portion 124. Core portion 122 has a central axis 126. Like the name implies, graded index fiber 120 has a parabolic index profile that provides a changing index of refraction, and therefore a changing NA, depending on how close to the center the incident light ray is. This is important because in the graded index case, the reported NA refers to the NA at the center. As shown in FIG. 1B, angle $\theta$ for a ray narrows as one goes from the center out to the core cladding interface. If the difference between the core and cladding refractive indices is very small, which it generally is, then the only rays accepted will be those that are nearly parallel to the core-cladding interface.

The reason for the parabolic index profile in graded index MMF is to enable the various modes to propagate down the fiber at the same speed. The higher the refractive index, the slower the light travels. The mode that travels straight down the middle of the fiber travels in the higher index portion and hence slower. The actual distance traveled is also shorter than a mode that weaves along near the core-cladding boundary. But, since the refractive index near the boundary is lower so that signals in that mode travel faster, the two modes arrive at the other end of the fiber at about the same time, cutting down on the modal dispersion.

Unfortunately, much of the optical fiber already installed in buildings throughout the country is legacy MMF (either 50 μm or 62.5 μm). For various technical reasons, connecting single mode optical fibers directly to legacy multimode optical fibers has proven difficult. In fact, it has generally been accepted that single mode optical fiber and multimode optical fiber are not compatible (see, e.g. Corning Optical Fiber White Paper #WP1160, *Fiber Selection Guide for Premises Networks*, David M. Bean, c. 1998, p. 4, which is incorporated herein by reference.)

Although it has been indicated that single mode optical fibers and multimode optical fibers are incompatible, there still remains a need to provide connections between legacy multimode fibers currently installed in many buildings and the single mode fibers that are the current standard.

BRIEF SUMMARY OF THE INVENTION

The present invention relates to systems, methods and devices for connecting a single mode optical fiber directly to a legacy multimode optical fiber. One method of doing so is to slightly offset the axis of the single mode fiber from the axis of the multimode fiber. The offset fibers can be encased in a ferrule to hold them in a fixed position with respect to each other. Alternately, the single mode fiber can be encased in its own ferrule, with the fiber axis offset from the ferrule axis. The multimode fiber can also be encased in its own ferrule, which is sized and configured to allow the single mode fiber ferrule to form an interference fit therein. The two ferrules can then be encased in a sleeve, which provides for the single mode fiber being offset from the multimode fiber.

Another method involves removing the cladding from the single mode fiber to expose the core. Once exposed, the core can then be joined with the cladding layer of the multimode fiber by heating and stretching the fibers. Heating and stretching occurs until the core of the single mode fiber and the cladding of the multimode fiber fuse and have the desired optical transmission properties. By so doing, signals from the single mode fiber can be transmitted into the multimode fiber.

A third method uses one or more collimating lenses optically coupled to an end of each of the single mode fiber and the multimode fiber. A focusing lens can be placed between the collimating lenses, or directly between the fiber end faces, to focus the light signals from the single mode fiber to the multimode fiber.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

Figure 1A:
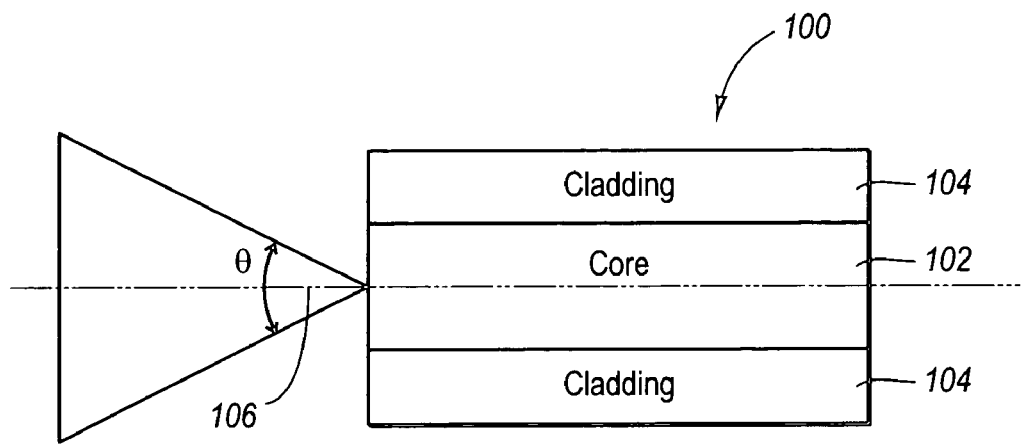
FIGS. 1A and 1B show a plan view of a light ray incident on an end of an optical fiber.
Figure 1B:
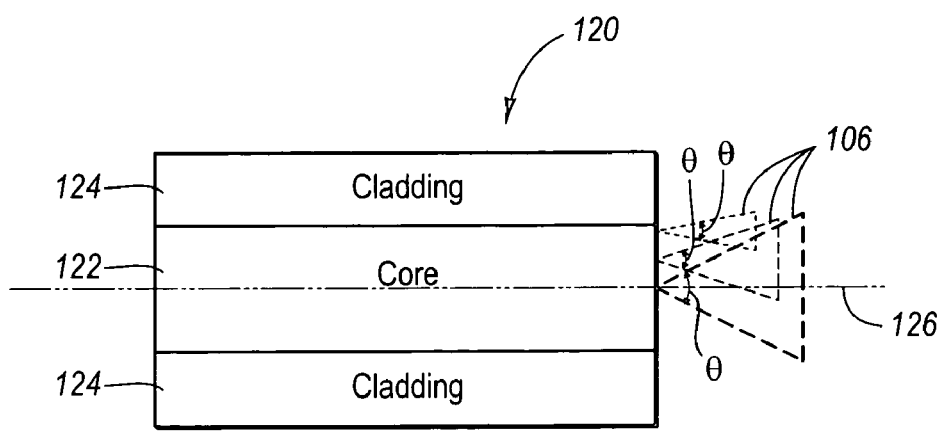
Figure 2A:
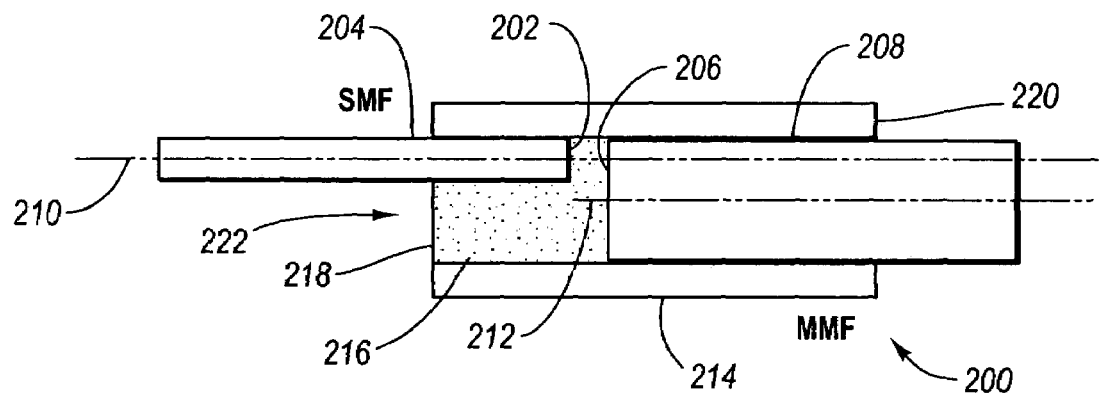
FIGS. 2A and 2B show a plan view of one exemplary embodiment of the present invention.
Figure 2B:
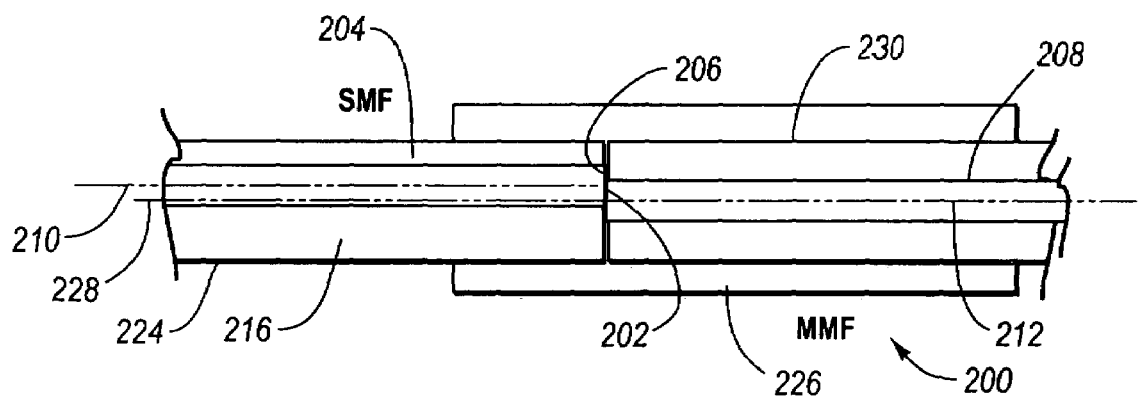

Exemplary embodiments of the present invention are directed to systems, devices, and methods for connecting single mode fiber optic cables to legacy multimode fiber optic cables, to facilitate signal propagation between the fibers. One type of exemplary system or device is depicted in FIGS. 2A and 2B, and is designated generally as reference numeral 200. System 200 uses off-set axes to facilitate propagation of a single mode signal from a single mode fiber to a multimode fiber.

With reference to FIG. 2A, system 200 includes a generally tubular ferrule 214 having a first end 218 and a second end 220. Extending between first end 218 and second end 220 is a hole 222 that receives an end 202 of a single mode fiber 204 and one end 206 of a multimode fiber 208. Hole 222 has a longitudinal axis along its length (not shown). The ends 202, 206 of the two fibers 204, 208 are positioned adjacent to each other but are not aligned coaxially. Instead, an axis 210 of single mode fiber 204 is offset from an axis 212 of multimode fiber 208. In this illustrated configuration, the longitudinal axis of hole 222 is coaxial with axis 212 of multimode fiber 208, however, in other configurations, axis 212 can be offset from the longitudinal axis of ferrule 214 and hole 222.

Both single mode fiber 204 and multimode fiber 208 can be encased in a single ferrule 214, as shown in FIG. 2A, or a combination of interlocking ferrules, or ferrule/sleeve combinations, an example of one configuration being shown in FIG. 2B. For the purposes of illustration, single mode fiber 204 is shown as smaller than multimode fiber 208, but in practice they both can have the same outside diameter, such as, but not limited to, a diameter of 125 μm, even though there is a large difference in the core sizes.

The cladding of single mode fibers is thicker than in a multimode fiber to contain the evanescent wave, the part of the electromagnetic wave that extends beyond the core of the fiber, which allows lower loss transmission. Protecting the evanescent wave in multimode fibers is not as important as protecting the evanescent wave in the single mode fiber because the transmission in multimode fibers is almost never limited by optical attenuation as it is in single mode fiber, but rather the transmission distance is limited by modal dispersion. There is also significant mechanical and connectivity convenience in having the OD of the two types of fibers the same. Thus, what is being illustrated is the offset position of the fiber cores within the much larger ferrule.

The ferrule 214 helps to maintain the offset between ends 202 and 206. While shown in FIG. 2A with a gap for the sake of clarity, those skilled in the art will realize that no gap need exist, and end surface 202 of single mode fiber 204 can abut end surface 206 of multimode fiber 208. In one exemplary embodiment, end surface 202 and end surface 206 are cut as physical contact (PC) polished fibers. The fiber faces 202, 206 are given a slight outward curvature so that when brought together under mild pressure there is no gap in the center.

A filler material 216 can be used to fill in any gaps between fibers 204, 208 and ferrule 214, and to hold both fibers 204, 208 in a fixed position with respect to each other. Filler material 216 can be, by way of example and not limitation, an optical epoxy resin, an optical cement or gel, or other material that is stable under various environmental conditions associated with use of optical fiber and capable of filling the space between fibers 204, 208 and an interior surface of ferrule 214. The space between the two fiber ends may be an air gap, provided the proper antireflective (AR) coating is put on the fiber ends. Even when the space between the fiber ends is filled with some epoxy or other adhesive material, the fiber end faces can be AR coated to achieve the desired insertion loss.

Generally, ferrule 214 can be constructed from any of a variety of materials, including but not limited to, plastics such as liquid crystal polymers (LCP), metals such as, but not limited to, stable steels, such as 416 and 440C, composites such as fiber reinforced LCP, synthetic materials such as zirconia and glass, natural materials, and other suitable materials that are stable under various environmental conditions and can be fabricated with high precision.

With reference to FIG. 2B, single mode fiber 204 can be encased in a ferrule 224 having an axis 228, such that an axis 210 of single mode fiber 204 is parallel to, but not collinear with, axis 228 of ferrule 224. Filler material 216 can also be used to hold fiber 204 in a fixed position in ferrule 224. The multimode fiber 208 may be encased coaxially in another ferrule 230. Surrounding ferrules 224, 230 is sleeve 226. The ferrules 224, 230 can have an outside diameter configured to fit within sleeve 226 so that sleeve 226 holds ferrules 224, 230 in a fixed position with respect to each other. Sleeve 226 can hold ferrules 223, 230 through an interference fit with ferrules 224, 230, bonding of ferrules 224, 230 with sleeve 226, combinations thereof, or other manners known to one skilled in the art. Since axis 210 is slightly offset from axis 212, the core of single mode fiber 204 is aligned at a point offset from axis 212 of multimode fiber 208.

The axis 228 of ferrule 224 can be collinear with axis 212 of ferrule 226 and fiber 208. However, this need not be the case. For purposes of this exemplary embodiment, it is sufficient that axis 210 of fiber 204 is offset from axis 212 of fiber 208 such that a signal from fiber 204 is launched into an outer portion of the core of fiber 208. The axis 210, 212 of each fiber 204, 208 need not be parallel to the axis of each ferrule 224, 230. It will be appreciated by those of skill in the art that other methods of offsetting the two axes to obtain the desired offset are also available, and the foregoing methods represent examples of such offsetting techniques.

It should be noted that the NA of some SMF can be about 0.11, while the NA of 50 µm MMF can be about 0.22. For graded index MMF, this is the NA at the middle of the core. As the offset moves closer to the core-cladding interface of the MMF, the NA will decrease. At some point the NA of the MMF can become less than the NA of the SMF, which can cause a dramatic increase in insertion loss and degradation of the corresponding signal. In exemplary embodiments of the present invention shown in FIGS. 2A and 2B, the offset point can be chosen to avoid this problem.

In the exemplary embodiments of the present invention shown in FIGS. 2A and 2B, single mode fiber 204 can be used to transmit coarse wavelength division multiplexed (CWDM) signals in the 1470-1610 nm band, having, for example, a 20 nm channel separation. However, one skilled in the art will realize that other wavelengths and channel separations are also possible and fall within the scope of this exemplary embodiment. These signals are launched into multimode fiber 208 towards an outside portion of the core of multimode fiber 208.

A cloud of electromagnetic energy emanates from the end of SMF 204. This cloud will distribute itself across whatever modes are available in multimode fiber 208. By launching towards the outside portion of the core of multimode fiber 208, the mode in the single mode fiber can excite the mode(s) in the multimode fiber at a defined phase condition. This allows a minimum number of higher order modes to be excited in MMF 208. This can be very effective in extending the transmission distance by cutting down the modal dispersion, since the higher order excited modes all travel at about the same velocity and path down MMF 208.

Figure 3A:
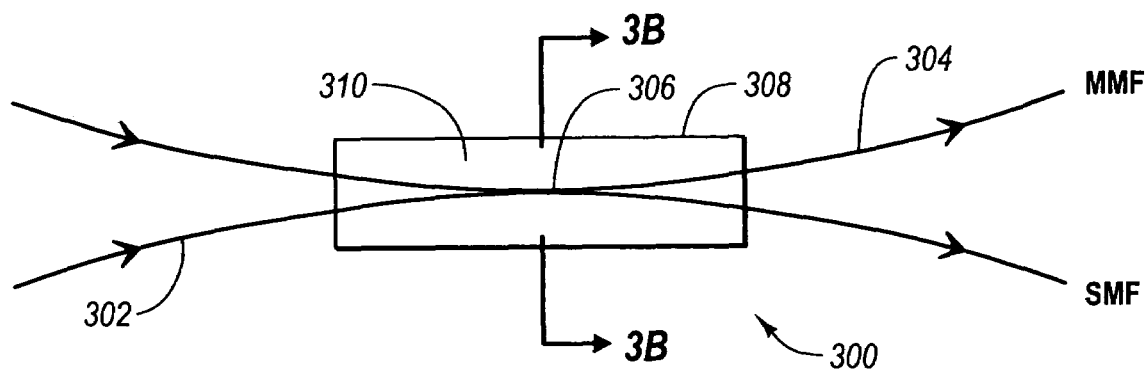
FIG. 3A is a plan view of another exemplary embodiment of the present invention.
Figure 3B:
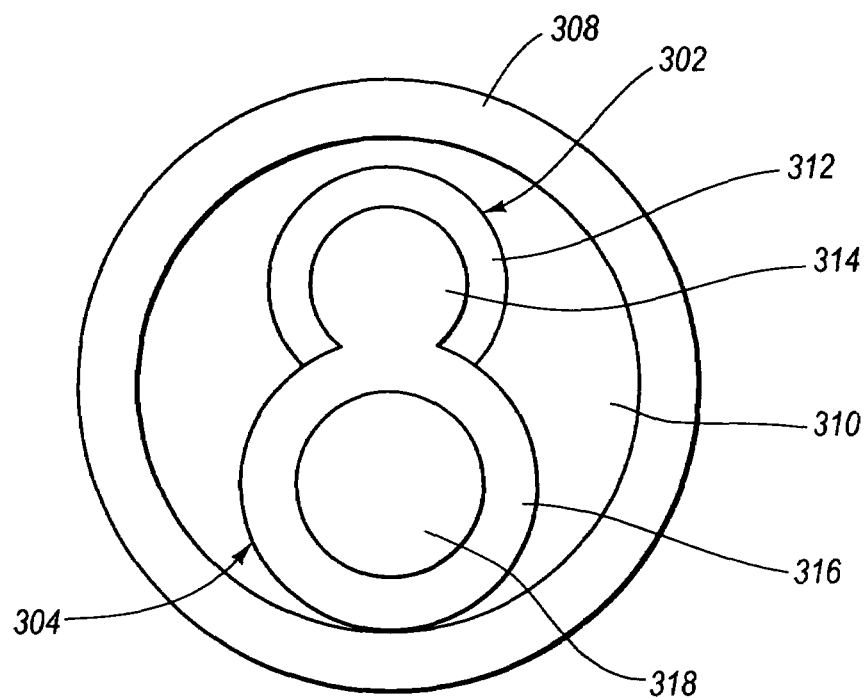
FIG. 3B is a cross-sectional view of the exemplary embodiment of FIG. 3A taken along line 3B-3B.

Another exemplary embodiment of a system of the present invention is shown in FIGS. 3A and 3B, and designated generally with reference numeral 300. In the embodiment illustrated in FIG. 3A, a ferrule 308 encases both a single mode fiber 302 and a multimode fiber 304. A portion of single mode fiber 302 is joined to multimode fiber 304, this portion or section being identified by reference numeral 306. The ferrule 308 provides mechanical strength and stability to joined section 306. Filler material 310 can be similar to filler material 216 and can secure fused section 306 by filling any space between fibers 302, 304 and ferrule 308.

FIG. 3B shows a cross-sectional view of joined section 306 within ferrule 308. Multimode fiber 304 has a cladding layer 316 and a core 318. Single mode fiber 302 has a cladding layer 312 and a core 314. The connection between single mode fiber 302 and multimode fiber 304 can be accomplished by stripping or removing a portion of cladding layer 312 of single mode fiber 302 to expose a portion of core 314. This portion of core 314 is then heated to fuse core 314 to cladding layer 316 of multimode fiber 304.

It is known in the art to strip the cladding layers away from two single mode fibers to expose the cores. The cores of the two single mode fibers can then be heated and fused to make a light signal coupler that has varying properties depending on the length of the heated and joined section and the wavelength of the light transmitted therethrough. A similar technique can be used to form a light signal coupler using two multimode fibers. By contrast, the crossover in this exemplary configuration of the present invention can be accomplished by joining cladding layer 316 of multimode fiber 304 with core 312 of single mode fiber 302. Joining SMF 302 with the cladding layer ensures that only a minimum number of modes of MMF 204 are excited. In this configuration, a portion of single mode fiber 302 contacts cladding 316 of MMF 304. The remainder of core 314 is surrounded by cladding 312, which also contacts cladding 316 of MMF 304.

To provide stability to the junction between SMF 302 and MMF 304, ferrule 308 surrounds SMF 302 and MMF 304. The ferrule 308 also prevents movement of SMF 302 relative to MMF 304. Ferrule 308 can also have a filler material 310 injected into the gap between fibers 302, 304 and ferrule 308. Filler material 310 can be similar to filler material 216 described herein. With the configuration illustrated in FIGS. 3A and 3B, signals from single mode fiber 302 can propagate along multimode fiber 304.

In the exemplary embodiment of the present invention shown in FIGS. 3A and 3B, SMF 302 can be used to transmit coarse wavelength division multiplexed (CWDM) signals in the 1470-1610 nm band, with a 20 nm channel separation. However, one skilled in the art will realize that other wavelengths and channel separation distances are also possible and fall within the scope of this exemplary embodiment. As with the previous embodiment, when launched in this manner, the CWDM signals can excite only one mode, or more than one higher order mode, within MMF 304.

The interaction length required to transfer the energy from SMF 302 to MMF 304 depends upon wavelength. Thus, at a given wavelength, the energy can all be transferred to a particular mode in MMF 304. Each wavelength will excite a different mode. The interaction length is likely to be correct, meaning it produces maximum energy transfer, for only one wavelength. It should be noted that even if one succeeds in transmitting all of the energy into one mode, the energy will soon diffuse into other modes. So what starts as a single mode will be more and more multimode as the signal propagates down the MMF.

Figure 4A:
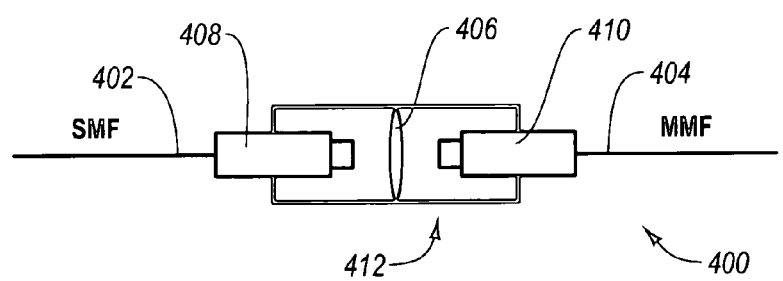
FIG. 4A is a plan view of yet another exemplary embodiment of the present invention.
Figure 4B:
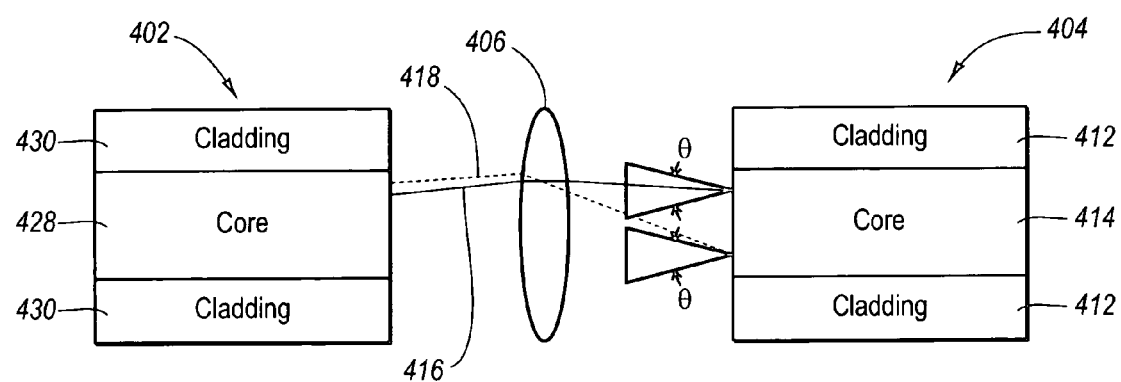
FIG. 4B is a plan view of an alternate configuration of the embodiment of FIG. 4A.

Yet a third exemplary system of the present invention is schematically illustrated in FIGS. 4A and 4B, and designated generally as reference numeral 400. In this exemplary embodiment, and with reference to FIG. 4A, a single mode fiber 402 and a multimode fiber 404 are aligned coaxially, although this need not be the case. One or more collimating lenses 408, 410 can be placed between fibers 402, 404 to allow for signal transmission from fiber 402 towards fiber 404. A focusing lens 406 focuses signals received from collimating lens 408 toward collimating lens 410 and hence fiber 404. The lenses 406, 408, 410 can be encased in a ferrule 412 to ensure that they remain in a fixed position with respect to each other. Optionally, a filler material (not shown) can be included within all or a portion of an interior of ferrule 412 to aid with securely retaining fibers 402, 404 and lenses 406, 408, and 410 within ferrule 412 at the desired axial orientation. The configuration of ferrule 412 and filler material (not shown) can be similar to the other ferrules and filler materials described herein and such other known to one skilled in the art in light of the teaching contained herein.

With reference to FIG. 4B, single mode fiber 402 is shown with a core 428 and a cladding layer 430. Multimode fiber 404 is shown with a core 414 and a cladding layer 412. Solid line 416 shows the desired result of the exemplary embodiment of FIG. 4B, which is that rays propagating from single mode fiber 402 from different points all get focused to the same spot on core 414 of multimode fiber 404. The majority of the propagating rays follow the optical path identified by solid line 416. However, as previously discussed, the fact that the rays from the end of SMF 402 form a cloud of electromagnetic energy means that one or more rays can follow the optical path illustrated by dashed line 418, and be focused to a different spot. Those one or more rays may be outside the acceptance angle θ of fiber 404, depending upon the NA at that point, and so will not propagate along fiber 404. Notwithstanding this occurrence, as long as the lenses focus a majority of the optical signal onto core 414 of multimode fiber 404, a minimum number of modes is excited in fiber 404, and the signal is propagated therethrough.

Various types of optical lenses made from varying materials can be used in this system to collimate and/or focus the light signals from the two optical fibers 402, 404. For instance, each collimating lens and focusing lens can include one or more optical components and one or more thin films to aid with directing or focusing received signals. Generally, the lense(s) or other optical components can have various configurations so long as the lense(s) achieve a filled launch from single mode fiber 402 to multimode fiber 404, thus exciting more than one mode in multimode fiber 404. As with the embodiments discussed above, the lense(s) are used to focus the signal from single mode fiber 402 into an outer portion of the core of MMF 404. This allows the minimum number of modes to be excited in MMF 404.

In the alternate exemplary system of the present invention shown in FIGS. 4A and 4B, single mode fiber 402 can be used to transmit coarse wavelength division multiplexed (CWDM) signals in the 1470-1610 nm band, with a 20 nm channel separation. However, one skilled in the art will realize that other wavelengths and channel separation distances are also possible and fall within the scope of this exemplary embodiment. In this embodiment, when launched in this manner, the CWDM signals can excite one or more modes within multimode fiber 404.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   a ferrule having a substantially constant inner diameter, and the ferrule defining:
      a first end; and
      a second end;
   a single mode fiber extending into the ferrule at the first end, the single mode fiber defining a single mode fiber axis;
   a multimode fiber extending into the ferrule at the second end, the multimode mode fiber defining a multimode fiber axis that is offset from the single mode fiber axis; and
   a filler material positioned proximate the interior surface and proximate respective portions of the single and multimode fibers.

2. The system as recited in claim 1, wherein the filler material is one of an optical epoxy resin, an optical cement, or an optical gel.

3. The system as recited in claim 1, wherein the multimode fiber axis is substantially coaxial with a longitudinal interior axis defined by the ferrule.

4. The system as recited in claim 1, wherein the multimode fiber axis is offset from a longitudinal interior axis defined by the ferrule.

5. The system as recited in claim 1, wherein an end surface of the single mode fiber abuts, within the ferrule, an end surface of the multimode fiber.

6. The system as recited in claim 1, wherein an end surface of the single mode fiber is spaced apart, within the ferrule, from an end surface of the multimode fiber such that a gap is defined between the respective end surfaces.

7. The system as recited in claim 6, wherein one or both of the end surfaces of the single mode and multimode fibers includes an antireflective coating.

8. The system as recited in claim 6, wherein the gap is at least partially filled with air.

9. The system as recited in claim 6, wherein the gap is at least partially filled by the filler material.

10. The system as recited in claim 1, wherein the ferrule is constructed from one of a liquid crystal polymer, a fiber reinforced liquid crystal polymer, 416 steel, 440C steel, zirconia, or glass.

11. The system as recited in claim 1, wherein the single mode fiber is configured to transmit coarse wavelength division multiplexed data signals in a wavelength range of about 1470 nanometers to about 1610 nanometers having a channel spacing of approximately 20 nanometers.

12. A system, comprising:
   a first ferrule having a first ferrule outside diameter and defining a first ferrule axis;
   a single mode fiber positioned in the first ferrule, the single mode fiber defining a single mode fiber axis;
   a second ferrule having a second ferrule outside diameter that is substantially the same as the first ferrule outside diameter, and the second ferrule defining a second ferrule axis;
   a multimode fiber positioned in the second ferrule, the multimode fiber defining a multimode fiber axis; and
   a sleeve configured to receive respective portions of the first and second ferrules such that the respective portions of the first and second ferrules reside in a fixed position with respect to each other, the single mode fiber axis being offset from the multimode fiber axis.

13. The system as recited in claim 12, wherein the single mode fiber axis is offset from the first ferrule axis.

14. The system as recited in claim 13, further comprising a filler material that holds the single mode fiber in a fixed position in the first ferrule.

15. The system as recited in claim 14, wherein the filler material is one of an optical epoxy resin, an optical cement, or an optical gel.

16. The system as recited in claim 12, wherein the fixed positions of the portions of the first and second ferrules are maintained by way of an interference fit between the sleeve and the first and second ferrules.

17. The system as recited in claim 12, wherein at least one of the first ferrule or the second ferrule is bonded to the sleeve.

18. The system as recited in claim 12, wherein the multimode fiber axis is substantially coaxial with the second ferrule axis.

19. The system as recited in claim 12, wherein the multimode fiber axis is offset from the second ferrule axis.

20. The system as recited in claim 12, wherein the single mode fiber is configured to transmit coarse wavelength division multiplexed data signals in a wavelength range of about 1470 nanometers to about 1610 nanometers having a channel spacing of approximately 20 nanometers.

* * * * *

UNITED STATES PATENT AND TRADEMARK OFFICE
CERTIFICATE OF CORRECTION

PATENT NO. : 7,352,937 B2  Page 1 of 1
APPLICATION NO. : 10/738250
DATED : April 1, 2008
INVENTOR(S) : Zhong et al.

It is certified that error appears in the above-identified patent and that said Letters Patent is hereby corrected as shown below:

Title Page
Item 56, Other Publications, change "Documentation entitled "Fiber Selection Guide for Premises Networks," Coming Incorporated Telecommucations Products Division, pp. 1-8, Issued May 1998, by David M. Bean." to -- Documentation entitled "Fiber Selection Guide for Premises Networks," Corning Incorporated Telecommunications Products Division, pp. 1-8, Issued May 1998, by David M. Bean. --

Signed and Sealed this

Thirty-first Day of August, 2010

David J. Kappos
*Director of the United States Patent and Trademark Office*